United States Patent [19]

Sano et al.

[11] Patent Number: 5,541,271

[45] Date of Patent: Jul. 30, 1996

[54] PROCESS FOR PREPARING POLYOLEFINS

[75] Inventors: Akira Sano, Tokyo; Shiraishi Takeichi, Kawasaki; Kunihiro Suzuki, Yokohama; Mitsuo Okamoto, Yokohama; Katsumi Usui, Yokohama; Hiroyuki Shimizu, Tokyo; Kazuo Matsuura, Yokohama, all of Japan

[73] Assignee: Nippon Oil Company, Limited, Tokyo, Japan

[21] Appl. No.: 380,149

[22] Filed: Jan. 30, 1995

Related U.S. Application Data

[63] Continuation of Ser. No. 229,057, Apr. 18, 1994, abandoned, which is a continuation of Ser. No. 101,663, Aug. 3, 1993, abandoned, which is a continuation of Ser. No. 861,262, Mar. 31, 1992, abandoned.

[30] Foreign Application Priority Data

Apr. 2, 1991 [JP] Japan .................. 3-094983

[51] Int. Cl.$^6$ .................................................. C08F 2/34
[52] U.S. Cl. ................. 526/129; 526/132; 526/133; 526/153; 526/348.2; 526/348.3; 526/348.4; 526/348.5; 526/348.6; 526/901; 502/117; 502/120
[58] Field of Search .................. 526/129, 133, 526/132, 153, 348.2, 348.3, 348.4, 348.5, 348.6, 901

[56] References Cited

U.S. PATENT DOCUMENTS

| | | | |
|---|---|---|---|
| 3,701,766 | 10/1972 | Delbouille et al. | 526/129 |
| 4,396,534 | 8/1983 | Matsuura et al. | 526/125 |
| 4,613,581 | 9/1986 | Maruyama et al. | 526/125 |
| 4,716,206 | 12/1987 | Fujita et al. | 526/125 |
| 4,732,882 | 3/1988 | Allen et al. | 526/129 |
| 4,849,390 | 7/1989 | Sano et al. | 526/129 |

FOREIGN PATENT DOCUMENTS

| | | |
|---|---|---|
| 208524 | 1/1987 | European Pat. Off. . |
| 2521662 | 11/1975 | Germany . |
| 1292853 | 10/1972 | United Kingdom . |

Primary Examiner—David W. Wu
Attorney, Agent, or Firm—Dilworth & Barrese

[57] ABSTRACT

A polyolefin having superior particle properties such as an extremely high bulk density, a large average particle diameter and a narrow particle size distribution, and having a narrow molecular weight distribution, is obtained in high yield, by polymerizing an olefin, using a catalyst comprising a solid catalyst component and an organometallic compound, the solid catalyst component being obtained by reacting a) a silicon oxide and/or an aluminum oxide, the reaction product of an organomagnesium compound and a compound of the general formula $Me(OR)_n X_{z-n}$, and a titanium compound, in the presence of ROH, and further reacting the resulting reaction product with a compound of the general formula $AlR_q X_{3-q}$.

13 Claims, No Drawings

PROCESS FOR PREPARING POLYOLEFINS

This is a continuation of application Ser. No. 08/229,057 filed on Apr. 18, 1994, now abandoned, which is a continuation of U.S. application Ser. No. 08/101,663 filed on Aug. 3, 1993, now abandoned, which is a continuation of U.S. application Ser. No. 07/861,262. filed Mar. 31, 1992, now abandoned.

BACKGROUND OF THE INVENTION

The present invention relates to a process for preparing polyolefins. More particularly, the present invention is concerned with a process for preparing polyolefins exhibiting better particle properties with increase of an average particle diameter, which process is capable of greatly increasing the polymer yield per solids and that per transition metal, thereby permitting the omission of the step of removing catalyst remaining in the resulting polymer, further capable of increasing the bulk density of the polymer and decreasing a fine particulate portion of the polymer.

Heretofore, in this technical field there have been known many catalysts comprising inorganic magnesium solids as carriers such as magnesium halide, magnesium oxide and magnesium hydroxide and a transition metal compound such as a titanium compound or a vanadium compound supported on the carriers. However, the polyolefins obtained in the prior art are generally low in bulk density, relatively small in average particle diameter and generally wide in particle size distribution so contain a large proportion of fine particles. For this reason, improvement has keenly been desired from the standpoint of productivity and polymer handling. Besides, when these powdery polymers are subjected to forming, there arise problems such as dusting and lowering of the forming efficiency. So there has been a keen desire for the foregoing increase of bulk density and decrease of the fine particulate portion. Further, still further improvements are considered necessary in order to satisfy the recent keen desire for omitting the pelletizing step and using a powdery polymer directly in a processing machine.

The present inventors have previously found a novel catalyst component with the above drawbacks remedied and already filed patent applications thereon (see Japanese Patent Publication Nos. 11651/1989 and 12289/1989 and Japanese Patent Laid-Open Nos. 149605/1985, 32105/1987 and 207306/1987). The use of this catalyst component can afford a polymer having a high bulk density and a large average particle diameter. However, a further improvement has been considered necessary for omitting the pelletizing step and using a powdery polymer directly in a processing machine.

It is the object of the present invention to remedy the above-mentioned drawbacks and obtain in extremely high activity a polymer having a high bulk density, a narrow particle size distribution, an extremely proportion of fine particles, and superior in fluidity.

SUMMARY OF THE INVENTION

The present invention resides in a process for preparing a polyolefin by polymerizing or copolymerizing an olefin or olefins in the presence of a catalyst comprising a solid catalyst component and an organometallic compound, said solid catalyst component being prepared by the reaction of the following components [I] and [II].

[I] a reaction product obtained by the reaction of the following components (1), (2) and (3) in the presence of a compound represented by the general formula $$R^4OH$$

wherein $R^4$ is a hydrocarbon radical having 1 to 20 carbon atoms, or an organic radical containing such element as oxygen, nitrogen, sulfur, or chlorine:

(1) a silicon oxide and/or an aluminum oxide,
(2) a product obtained by a contact reaction of:
    <a> an organomagnesium compound represented by the general formula $$R^1_m MgX_{2-m}$$

wherein $R^1$ is a hydrocarbon radical having 1 to 20 carbon atoms, X is a halogen atom, and m is in the range of $0 < m \leq 2$, and
    <b> a compound represented by the general formula $$Me(OR^2)_n X_{z-n}$$

wherein Me represents an element of Groups I to IV of the Periodic Table, z is the valence of Me, n is $0 < n \leq z$, X is a halogen atom, and $R^2$ is a hydrocarbon radical having 1 to 20 carbon atoms, and (3) a titanium compound represented by the general formula $$Ti(OR^3)_p X_{4-p}$$

wherein $R^3$ is a hydrocarbon radical having 1 to 20 carbon atoms, X is a halogen atom, and p is $0 \leq p \leq 4$; and

[II] a compound represented by the general formula $$AlR^5_q X_{3-q}$$

wherein $R^5$ is a hydrocarbon radical having 1 to 20 carbon atoms, X is a halogen atom, and q is $0 < q \leq 3$.

By the process of the present invention there is obtained, in extremely high activity, a polyolefin having a relatively large average particle diameter, narrow particle size distribution and a reduced proportion of fine particles. Besides, the bulk density and free fluidity of the polyolefin are high. These characteristics are very advantageous to the polymerization operation. Further, the polyolefin prepared by the process of the present invention can be subjected to forming not only as pellets but also in the form of powder, without causing any trouble.

It is also a characteristic feature of the present invention that the polymer obtained using the catalyst specified in the present invention is extremely narrow in its molecular weight distribution and small in the amount thereof extracted in hexane, and that the amount of low grade polymers by-produced is very small. Therefore, when film is formed using the polyolefin of a narrow molecular weight distribution prepared by the process of the present invention, it has a lot of merits, for example, high transparency, superior anti-blocking property and heatsealability.

DETAILED DESCRIPTION OF THE INVENTION

The present invention will be described concretely hereinunder.

The catalyst used in the polyolefin preparing process of the present invention comprises a solid catalyst component and an organometallic compound, said solid catalyst component being prepared by reacting the following components [I] and [II]:

[I] a product (obtained by the reaction of the following components (1), (2), and (3) in the presence of a compound represented by the general formula R⁴OH:

(1) a silicon oxide and/or an aluminum oxide, (2) a product obtained by a contact reaction of:
<a> an organomagnesium compound represented by the general formula

$R^1_m MgX_{2-m}$, and

<b> a compound represented by the general formula

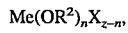

$Me(OR^2)_n X_{z-n}$, and (3) a titanium compound represented by the general formula

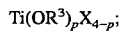

$Ti(OR^3)_p X_{4-p}$;

and

[II] a compound represented by the general formula

$AlR^5_q X_{3-q}$

<1> Solid Catalyst Component

1. Component [I]

(1) The silicon oxide used in the present invention is silica or a double oxide of silicon and at least one another metal selected from Groups I–VIII of the Periodic Table.

The aluminum oxide used in the present invention is alumina or a double oxide of aluminum and at least one another metal selected from Groups I–VIII in the Periodic Table.

As typical examples of the double oxide of silicon or aluminum and at least one another metal selected from Groups I–VIII in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, and $SiO_2 \cdot MgO$. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of impurities.

Although the properties of the silicon oxide and/or aluminum oxide used in the present invention are not specially limited so far as the objects of the present invention are not adversely affected thereby, a silica having a particle diameter of 1 to 200 μm, an average pore volume of greater than 0.3 ml/g and a surface area of greater than 50 m²/g is preferred. Also, it is preferably calcined at 200°–800° C. by a conventional method prior to use.

(2) The organomagnesium compound of the general formula $R^1_m MgX_{2-m}$ used in the present invention is one wherein R is a hydrocarbon radical having 1 to 20, preferably 1 to 10, carbon atoms, and m is in the range of $0 < m \leq 2$. Examples of such hydrocarbon radicals are alkyl, aryl, aralkyl, alkoxy and aryloxy. As examples of the said organomagnesium compound there are mentioned compounds known as Grignard compounds, including methylmagnesium chloride, methylmagnesium bromide, methylmagnesium iodide, ethylmagnesium chloride, ethylmagnesium bromide, ethylmagnesium iodide, propylmagnesium chloride, propylmagnesium bromide, propylmagnesium iodide, butylmagnesium chloride, sec-butylmagnesium chloride, tert-butylmagnesium chloride, butylmagnesium bromide, n-butylmagnesium iodide, isobutylmagnesium chloride, isobutylmagnesium bromide, isobutylmagnesium iodide, hexylmagnesium chloride, hexylmagnesium bromide, hexylmagnesium iodide, octylmagnesium chloride, octylmagnesium bromide, octylmagnesium iodide, decylmagnesium chloride, decylmagnesium bromide, decylmagnesium iodide, phenylmagnesium chloride, phenylmagnesium bromide, phenylmagnesium iodide, allylmagnesium chloride, and benzylmagnesium chloride. Also employable are dialkylmagnesiums, dialkoxymagnesiums, alkylalkoxymagnesiums and alkoxylagnesium halides. Examples are dimethylmagnesium, diethylmagnesium, dipropylmagnesium, diisopropylmethylmagnesium, dibutylmagnesium, di-sec-butylmagnesium, di-tert-butylmagnesium, butylethylmagnesium, butyl-sec-butylmagnesium, butyl-tert-butylmagnesium, dihexylmagnesium, hexylethylmagnesium, magnesium dimethoxide, magnesium diethoxide, magnesium dipropoxide, magnesium diisopropoxide, magnesium dibutoxide, magnesium-di-sec-butoxide, magnesium di-tert-butoxide, magnesium diphenoxide, methoxyethoxymagnesium, methoxy propoxymagnesium, methoxyisopropoxymagnesium, methoxybutoxymagnesium, ethoxypropoxymagnesium, ethoxyisopropoxymagnesium, ethoxybutoxymagnesium, methoxymagnesium chloride, ethoxymagnesium chloride, propoxymagnesium chloride, butoxymagnesium chloride, methylmethoxymagnesium, methylethoxymagnesium, ethylethoxymagnesium, and ethylpropoxymagnesium. Particularly preferred are methylmagnesium chloride, methylmagnesium bromide, ethylmagnesium chloride, ethylmagnesium bromide, propylmagnesium chloride, propylmagnesium bromide, butylmagnesium chloride, and butylmagnesium bromide.

As examples of the compound of the general formula $Me(OR^2)_n X_{z-n}$ used in the present invention wherein Me represents an element of Groups I tow in the Periodic Table, z represents the valence of the element Me, n is $0 < n \leq z$, X is a halogen atom, and $R^2$ is a hydrocarbon residue having 1 to 20, preferably 1 to 8, carbon atoms such as, for example, alkyl, aryl, or aralkyl, and $R^2$ may be the same or different, there are mentioned compounds represented by NaOR, $Mg(OR)_2$, $Mg(OR)X$, $Ca(OR)_2$, $Zn(OR)_2$, $Cd(OR)_2$, $B(OR)_2$, $Al(OR)_3$, $Al(OR)_2$, X, $Al(OR)X_2$, $Si(OR)_4$, $Si(OR)_3X$, $Si(OR)_2X_2$, $Si(OR)X_3$, and $Sn(OR)_4$. More concrete and preferred examples are $Mg(OC_2H_5)_2$, $Mg(OC_2H_5)Cl$, $Al(OCH_3)_3$, $Al(OC_2H_5)_3$, $Al(On-C_3H_7)$, $Al(Oi-C_3H_7)_3$, $Al(On-C_4H_9)_3$, $Al(Osec-C_4H_9)_3$, $Al(Ot-C_4H_9)_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Al(OC_6H_5)_3$, $Al(OC_6H_5)_2Cl$, $Al(OC_6H_5)Cl_2$, $Al(OC_6H_4CH_3)_3$, $Al(OC_6H_4CH_3)_2Cl$, $Al(OC_6H_4CH_3)Cl_2$, $Al(OCH_2C_6H_5)_3$, $Si(OC_2H_5)$, $Si(OC_2H_5)_3Cl$ $Si(OC_2H_5)_2Cl_2$, $Si(OC_2H_5)Cl_3$, $Si(OC_6H_5)_4$, $Si(OC_6H_5)_3Cl$, $Si(OC_6H_5)_2Cl_2$, $Si(OC_6H_5)Cl_3$, $Si(OCH_2C_6H_5)_4$, $B(OCH_3)_3$, $B(OC_2H_5)_3$, $B(OC_4H_7)_3$.

The reaction ratio of the compound of the general formula $Me(OR^2)_nX_{z-n}$ to the organomagnesium compound of the general formula $R^1_mMgX_{2-m}$ is in the range of 0.01 to 10, preferably 0.1 to 5, in terms of Me/Mg (mole ratio). How to react both compounds is not specially limited. For example, both compounds may be mixed and reacted under heating at 20°–400° C., preferably 50°–300° C., for 5 minutes to 10 hours in an organic solvent. Examples of organic solvents employable in this reaction include inert hydrocarbons such as pentane, hexane, cyclohexane, heptane, octane, nonane, decane, benzene, toluene, and xylene; alcohols which will be described later; phenols which will also be described later; ethers such as dimethyl ether, diethyl ether, dibutyl ether, isoamyl ether, anisole, phenethate, diphenyl ether, phenylallyl ether, benzofuran, and tetrahydrofuran; ketones such as acetone, methyl ethyl ketone, methyl isobutyl ketone, methyl phenyl ketone, ethyl phenyl ketone, and diphenyl ketone; esters such as methyl formate, methyl acetate, ethyl acetate, propyl acetate, octyl acetate, ethyl propionate, methyl butyrate, ethyl valerate, methyl methacrylate, methyl benzoate, ethyl benzoate, propyl benzoate, octyl benzoate, phenyl benzoate, benzyl benzoate, ethyl o-methoxybenzoate, ethyl p-methoxybenzoate, butyl p-ethoxybenzoate, methyl p-toluylate, ethyl p-toluylate, ethyl p-ethylbenzoate, methyl salicylate, phenyl salicyate, methyl naphthoate, ethyl naphthoate, and ethyl anisate; amines such as methylamine, ethylamine, diethylamine, tributylamine, piperridine, tribenzylamine, aniline, pyridine, picoline, and tetramethylenediamine; nitriles such as acetonitrile, benzonitrile, and tolunitrile; and mixtures thereof. Ethers are particularly preferred.

(3) As examples of the titanium compound of the general formula $Ti(OR^2)_pX_{1-p}$ used in the present invention wherein R is a hydrocarbon radical having 1 to 20, preferably 1 to 12, carbon atoms such as an alkyl, aryl or aralkyl group, X is a halogen atom, and n is $0 \leq p \leq 4$, there are mentioned compounds represented $Ti(OR^2)_4$ such as tetramethoxytitanium, tetraethoxytitanium, tetra-n-propoxytitanium, tetraisopropoxytitanium, tetra-n-butoxytitanium, tetraisobutoxytitanium, tetra-sec-butoxytitanium, tetra-tert-butoxytitanium, tetra-n-pentyloxytitanium, tetra-cyclopentyloxytitanium, tetra-n-hexyloxytitanium, tetracyclohexyloxytitanium, tetra-n-heptyloxytitanium, tetra-n-octyloxytitanium, tetra-2-ethylhexyloxytitanium, tetranonyloxytitanium, tetra-decyloxytitanium, tetraisobornyloxytitanium, tetra-oleyloxytitanium, tetraallyloxytitanium, tetrabenzyloxytitanium, tetrabenzhydryloxytitanium, tetraphenoxytitanium, tetra-o-methylphenoxytitanium, tetra-m-methylphenoxytitanium, tetra-1-naphthyloxytitanium and tetra-2-naphthyloxytitanium, and compounds represented by $Ti(OR^3)_pX_{4-p}$ wherein p is $0 \leq <4$ such as titanium tetrahalides (e.g. titanium tetrachloride, titanium tetrabromide, titanium tetraiodide), monomethoxytrichlorotitanium, dimethoxydichlorotitanium, trimethoxymonochlorotitanium, monoethoxytrichlorotitanium, monoethoxytrifluorotitanium, monomethoxytrichlorotitanium, diethoxydifluorotitanium, diethoxydichlorotitanium, diethoxydibromotitanium, triethoxyfluorotitanium, triethoxychlorotitanium, monopropoxytrichlorotitanium, dipropoxydichlorotitanium, diisopropoxydichlorotitanium, diisopropoxydibromotitanium, tripropoxyfluorotitanium, tripropoxychlorotitanium, monobutoxytrichlorotitanium, monoisobutoxytrichlorotitanium, dibutoxydichlorotitanium, diisopropoxydichlorotitanium, tributoxyfluorotitanium, tributoxychlorotitanium, triisobutoxychlorotitanium, monopentoxytrichlorotitanium, dispentoxycichlorotitanium, tripentoxymonochlorotitanium, monooctyloxytrichlorotitanium, dioctyloxydichlorotitanium, trioctyloxymonochlorotitanium, mono-2-ethylhexyloxytrichlorotitanium, di-2-ethylhexyloxydichlorotitanium, tri-2-ethylhexyloxymonochlorotitanium, monophenoxytrichlorotitanium, diphenoxydichlorotitanium, triphenoxychlorotitanium, tri-o-xylenoxychlorotitanium, and mixtures thereof. Titanium compounds represented by $Ti(OR)_4$ are more preferable. Among them, particularly, tetraisopropoxytitanium, tetra-n-butoxy-titanium, tetra-n-hexyloxytitanium, tetra-n-oxtyloxy-titanium and tetra-2-ethylhexyloxytitanium are preferred. Preferable titanium compound represented by $Ti(OR^3)_pX_{4-p}$ wherein p is $0 \leq p < 4$ are titanium tetrachloride, mono ethoxytrichlorotitanium, diethoxydichlorotitanium, monobutoxytrichlorotitanium and dibutoxydichlorotitanium.

(4) The component [I] used in the present invention is obtained by the reaction, in the presence of a compound represented by the general formula $R^4OH$, of (1) a silicon oxide and/or an aluminum oxide (component [I]-(1)), (2) a reaction product (component [I]-(2)) obtained by the reaction of an organomagnesium compound of the general formula $R^1_m MgX_{2-m}$ and a compound of the general formula $Me(OR^2)_nX_{z-n}$, and (3) a titanium compound (component [I]-(3)) of the general formula $Ti(OR^3)_pX_{4-p}$.

The compound represented by the general formula $R^4OH$ is one wherein $R^4$ is a hydrocarbon radical having 1 to 20, preferably 6 to 12, carbon atoms, or an organic radical containing such element as oxygen, nitrogen, sulfur, or chlorine. Preferred examples of the said hydrocarbon radical are alkyl alkenyl, aryl, and aralkyl. Particularly preferred are hydrocarbon radicals having a branch structure. As preferred examples of this compound there are mentioned methanol, ethanol, 1-propanol, 2-propanol, 1-butanol, 2-methyl-1-propanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, 1-hexanol, 2-methyl-1-pentanol, 4-methyl-1-pentanol, 4-methyl- 2-pentanol, 2-ethyl-1-butanol, 1-heptanol, 2-pentanol, 3-heptanol, 4-heptanol, 2,4-dimethyl-3-pentanol, 1-octanol, 2-octanol, 2-ethyl-1-hexanol, 3,5-dimethyl-1-hexanol, 2,2,4-trimethyl-1-pentanol, 1-nonanol, 5-nonanol, 3,5-dimethyl-4-heptanol, 2,6-dimethyl-4-heptanol, 3,5,5-trimethyl- 1-hexanol, 1-decanol, 1-undecanol, 1-dodecanol, 2,6,8-trimethyl-4-nonanol, 1-tridecanol, 1-pentadecanol, 1-hexadecanol, 1-heptadecanol, 1-octadecanol, 1-nonadecanol, 1-eicosanol, phenol, chlorophenol, benzyl alcohol, methyl cellosolve, and mixtures thereof. Particularly, 2-methyl-1-pentanol, 4-methyl-1-pentanol, 4-methyl-2-pentanol, 2-ethyl- 1-butanol, 2,4-dimethyl-3-pentanol, 2-ethyl-1-hexanol, 3,5-dimethyl- 1-hexanol, 2,2, 4-trimethyl-1-pentanol, 3,5-dimethyl- 1-heptanol, 2,6-dimethyl-4-heptanol and 3,3,5-trimethyl- 1-hexanol.

Of course, various denatured alcohols, called methanol denatured alcohols and hexane-denatured alcohols, which are available commercially as industrial alcohols, are also employable without any trouble.

How to react the compounds [I]-(1) to [I]-(3) for obtaining the component [I] is not specially limited if only the reaction is conducted in the presence of a compound of the general formula $R^4OH$. Any of the following reaction orders may be adopted:

A: components [I]-(1) to [I]-(3) are contacted together simultaneously.

B: components [I]-(1) to [I]-(2) are contacted together, followed by further contact with component [I]-(3).

C: components [I]-(1) to [I]-(3) are contacted together, followed by further contact with component [I]-(2).

D: components [I]-(2) to [I]-(3) are contacted together, followed by further contact with component [I]-(1).

Among the above contacting orders, (D) is preferred. More preferably, using an ether as an additional solvent, components [I]-(2) and [I]-(3) are dissolved therein and contacted together in advance, followed by contact with component [I]-(3) are dissolved therein and contacted together in advance, followed by contact with component [I]-(1). In this case, the dissolving order the ether of both components is not specially limited. Both may be dissolved at a time, or one may be dissolved in advance of the other.

According to a preferred way of reaction of these components, the components [I]-(1), -(2), -(3) are mixed and reacted in accordance with any of the above contacting orders as a temperature of 20°300° C., preferably 50°–150° C., for 1 minute to 48 hours, preferably 1 to 5 hours, in the presence of a compound of the general formula $R^4OH$, thereafter, the compound of the general formula $R^4OH$, and the solvent are removed under reduced pressure and/or under heating, or by any other suitable method.

The following description is now provided about component ratios in the reaction. First, as to the ratio of components [I]-(1) and -(2), it is desirable for both to be reacted so that the number of moles of Mg in component [I]-(2) is in the range of 0.01 to 20 mmol, preferably 0.1 to 10 mmol, more preferably 0.2 to 4.0 mmol, per gram of component a[I]-(1).

As to the ratio of components [I]-(1) and -(3), this differs depending on whether the component [I]-(1) is calcined or not and conditions for the calcining treatment if conducted, but it is desirable for both to be reacted using 0.01 to 10.0 mmol, preferably 0.1 to 5.0 mmol, more preferably 0.2 to 2.0 mmol, of component [I]-(3) per gram of component [1]-(1).

The amount of the compound of the general formula $R^4OH$ is usually 0.1 to 50 g, preferably 1 to 30 g, per gram of component [I]-(2).

2. Component [II]

The organoaluminum compound of the general formula $AlR^5_qX_{3-q}$ used in the present invention is one wherein $R^5$ is a hydrocarbon radical having 1 to 24, preferably 1 to 12, carbon atoms such as an alkyl, aryl or aralkyl group, X is a halogen atom such as a bromine, chlorine or iodine atom and q is 0<n<3. Examples of such organoaluminum compound are phenylaluminum dichloride, diphenylaluminum chloride, benzylaluminum dichloride, dibenzylaluminum chloride, dimethylaluminum chloride, diethylaluminum fluoride, diethylaluminum chloride, diethylaluminum bromide, diethylaluminum iodide, diisobutylaluminum chloride, methylaluminum sesquichloride, ethylaluminum sesquichloride, ethylaluminum sesquibromide, methylaluminum dichloride, ethylaluminum dichloride, isobutylaluminum dichloride, and mixtures thereof. Particularly, diethylaluminum chloride, ethylaluminum sesquichloride and ethylaluminum dichloride are preferred.

3. Preparation of Solid Catalyst Component

The solid catalyst component used in the present invention is obtained by reacting the components [I] and [II]. In this case, how to contact both components with each other is not specially limited. For example, according to a preferred method, both components are mixed and reacted together under heating at a temperature of 0° to 300° C., preferably 20° to 150° C., for 5 minutes to 10 hours, in inert to conventional Ziegler catalysts, such as, for example, pentane, hexane, cyclohexane, heptane, octane, nonane, decane, benzene, toluene, or xylene, and thereafter the solvent is removed by evaporation.

Preferably, the components [I] and [II] are reacted together at a reaction ratio in the range of 0.01 to 100, preferably 0.2 to 10, more preferably 0.5 to 5, in terms of component [II]/{component [I]-(3) in component [I]} (molar ratio).

Of course, the reactions for the preparation of the component [I], and the solid catalyst component should be performed in an inert gas atmosphere, and moisture should be avoided.

<2> Organometallic Compound

The catalyst used in the present invention comprises the above mentioned solid catalyst component and an organometallic compound.

As the organometallic compound used in the present invention, there may be preferably employed an organometallic compound of a metal of Groups I–IV in the Periodic Table which is known as a component of Ziegler type catalyst. Particularly preferred are organoaluminum compounds and organozinc compounds. To illustrate these compounds, mention may be made of organoaluminum compounds of the general formulae $R_3Al$, $R_2AlX$, $RAlX_2$, $R_2AlOR$, $RAl(OR)X$ and $R_3Al_2X_3$ wherein R, which may be the same or different, is an alkyl or aryl group having 1 to 20 carbon atoms and X is a halogen atom, as well as organozinc compounds of the general formula $R_2Zn$ wherein R, which may be the same or different, is an alkyl group having 1 to 20 carbon atoms. Concrete examples are trimethylaluminum, triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, diethylaluminum ethoxide, ethylaluminum sesquichloride, diethylzinc, and mixtures thereof.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole of the organometallic compound. Where it is used as an addition compound of the organometallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate methyl anisate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl esters, of benzoic acid, o- or p-toluic acid and anisic acid.

<3> Polymerization of Olefin

The olefin polymerization using the catalyst of the present invention can be performed in the form of slurry polymerization, solution polymerization or vapor phase polymerization. The catalyst used in the present invention is particularly suitable for vapor phase polymerization. The polymerization reaction is carried out in the same way as in the conventional olefin polymerization reaction using a Ziegler type catalyst. More particularly, the reaction is performed in a substantially oxygen- and water-free condition in the presence or absence of an inert hydrocarbon. Olefin polymerizing conditions involve temperatures in the range of 20° to 120° C., preferably 50° C. to 100° C., and pressures in the range of atmospheric pressure to 70 kg/cm$^2$, preferably 2 to 60 kg/cm$^2$. Adjustment of the molecular weight can be done to some extent by changing polymerization conditions such as the polymerization temperature and the catalyst mole ratio, but the addition of hydrogen into the polymerization system is more effective for this purpose. Of course, using the catalyst of the present invention, there can be performed two or more multi-stage polymerization reactions involving different polymerization conditions such as different hydrogen concentrations and different polymerization temperatures.

The process of the present invention is applicable to the polymerization of all olefins that can be polymerized using a Ziegler type catalyst, preferably α-olefins having 2 to 12 carbon atoms. For example, it is suitable for the homopolymerization of such α-olefins as ethylene, propylene, 1-butene, 1-hexene and 4-methyl-1-pentene and the copolymerization of ethylene and an α-olefin having 3–12 carbon atoms such as propylene, 1-butene, 1-hexene and 4-methylpentene-1, the copolymerization of propylene and 1-butene and the copolymerization of ethylene and one or more α-olefins.

Copolymerization with dienes is also preferable for the modification of polyolefins. Examples of diene compounds which may be used for this purpose are butadiene, 1,4-hexadiene, ethylidene norbornene and dicyclopentadiene. The comonomer content in the copolymerization may be selected optionally. For instance, when ethylene and a α-olefin having 3–12 carbon atoms is copolymerized, the α-olefin content in the copolymer is preferably 0–40 molar %, more preferably 0–30 molar %.

<Effects of the Invention>

Homopolymers or copolymers of olefins prepared by using as catalyst the solid catalyst component and the organometallic compound in the present invention are remarkably high in bulk density, relatively large in average particle diameter and narrow in particle size distribution and have a reduced proportion of fine particles, so there is little adhesion of polymer to the reactor walls during polymerization thus permitting stable operations. Besides, not only dusting can be prevented in a forming operation and so the efficiency of the forming operation can be enhanced, but also it is possible to omit a pelletizing step.

Further, since the homopolymers or copolymers in question according to the present invention are narrow in molecular weight distribution, they can be formed into films having high strength and superior in transparency and also superior in anti-blocking property and heat-sealability.

<EXAMPLES>

The following examples are given to further illustrate the present invention and for practising the invention, but it is to be understood that the invention is not limited thereto.

[How to Measure Physical Properties of Polymer]

Melting Point

Using a differential scanning calorimeter (DSC) (a product of Seiko Denshi K.K.), a polymer sample weighing 5 mg is once melted at 180° C. and then cooled to –40° C., thereafter the temperature is raised at a rate of 10° C./min and the temperature corresponding to an endothermic peak top is regarded as the melting point of the polymer.

Hexane Extraction

A copolymer powder is roll-milled at 180° C. and then pressed into a 5 cm×5 cm×0.2 mm sheet, thereafter the sheet is extracted in boiling hexane for 5 hours and the percent reduction in weight is regarded as hexane extraction.

Example 1

(a) Preparation of Solid Catalyst Component

A three-necked flask equipped with a stirrer and a reflux condenser was purged with nitrogen, into which were then placed 50 cc of tetrahydrofuran and 0.05 mole of a solution of ethylmagnesium chloride in tetrahydrofuran. Then, 1.6 g (0.01 mole) of aluminum triethoxide, 11.4 g (0.05 mole) of tetraethoxytitanium and 8.9 g (0.1 mole) of 2 methyl-1-pentanol were charged into the flask under stirring and reaction was allowed to take place under reflux for 3 hours. After cooling to room temperature, 46 g of silica (Fuji-Davison #955) which had been calcined at 400° C. for 3 hours was put into the flask and reaction was again conducted under reflux for 2 hours. Thereafter, drying was performed at 120° C. under reduced pressure for 2 hours. Then, 100 cc of dehydrated hexane and 0.1 mole of diethylaluminum chloride were added and a preliminary reduction was conducted at room temperature for 1 hour. The hexane was removed by blowing of nitrogen at 60 ° C. to obtain a solid catalyst component.

(b) Vapor Phase Polymerization

A stainless steel autoclave equipped with a stirrer was used as a vapor-phase polymerization apparatus, and a loop was formed-using a blower, a flow control device and a dry cyclone. The temperature of the autoclave was adjusted by flowing hot water through a jacket. Into the autoclave adjusted to 80° C. were fed the solid catalyst component prepared above and triethylaluminum at rates of 250 mg/hr and 50 mmol/hr, respectively. Further, butene-1, ethylene and hydrogen gases were fed while adjusting the butene-1/ethylene mole ratio in the vapor phase in the autoclave to 0.25 and a partial pressure of hydrogen to 15% of the total pressure. The gases in the system were circulated by means of the blower while maintaining the total pressure at 8 kg/cm$^2$G. Under these conditions, a continuous polymerization was carried out for 10 hours while withdrawing the resulting polymer intermittently.

The ethylene copolymer thus obtained was in the form of round particles having a melt flow rate (MFR) of 0.93 g/10 min, a density of 0.9201 g/cm$^3$, a bulk density of 0.45 g/cm$^3$ and an average particle diameter of 820 μm. Catalytic activity was 220,000 g.copolymer/g.Ti and thus extremely high. After the continuous 10 hour polymerization, the interior of the autoclave was checked to find no polymer deposition on the inner wall and the stirrer.

The copolymer was measured for FR value in accordance with the method defined by ASTM-D1238-65T, which FR value (FR=MFR$_{10}$/MFR$_{2.16}$) is represented in terms of the kg to a melt flow rate (MFR$_{2.16}$) determined at a load of 2.16 kg both at 190° C. As a result, the FR value was 7.4 and thus the molecular weight distribution was very narrow. The melting point of the copolymer was 121.9° C. and hexane extraction was 2.9 wt %.

Example 2

(a) Preparation of Solid Catalyst Component

A three-necked flask equipped with a stirrer and a reflux condenser was purged with nitrogen, into which were then placed 50 cc of tetrahydrofuran and 0.05 mole of a solution of n-butylmagnesium chloride in tetrahydrofuran. Then, 1.6 g (0.01 mole) of aluminum triethoxide, 11.4 g (0.05 mole) of tetraethoxytitanium and 2.5 g of 2-methyl-1-pentanol were charged into the flask under stirring and reaction was allowed to take place under reflux for 3 hours.

After cooling to room temperature, 26 g of silica (Fuji-Davison +955) which had been calcined at 400° C. for 3 hours was put into the flask and reaction was again conducted under reflux for 2 hours, followed by drying at 120° C. under reduced pressure for 2 hours. Then, 100 cc of dehydrated hexane and 0.1 mole of diethylaluminum chloride were added and a preliminary reduction was conducted at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.44, an MFR of 0.88 g/10 min, a density of 0.9211 g/cm$^3$ and an average particle diameter of 770 μm. Catalytic activity was high as 200,000 g.copolymer/g.Ti. FR value was 7.5 and thus the molecular weight distribution was narrow. Melting point was 121.7° C. and hexane extraction was 2.8 wt %.

Example 3

(a) Preparation of Solid Catalyst Component

A three-necked flask equipped with a stirrer and a reflux condenser was purged with nitrogen, into which were then placed 50 cc of tetrahydrofuran and 0.05 mole of a solution of ethylmagnesium chloride in tetrahydrofuran. Then, 1.6 g (0.01 mole) of aluminum triethoxide and 11.4 g (0.05 mole) of tetraethoxytitanium were charged into the flask with stirring and reaction was allowed to take place under reflux for 3 hours. After cooling to room temperature, 46 g of silica (Fuji-Davison +955) which had been calcined at 400° C. for 3 hours was put into the flask and again reaction was performed under reflux for 2 hours, followed by drying at 120° C. under reduced pressure for 2 hours. Then, 100 cc of dehydrated hexane and 8.9 g (0.1 mole) of 2-methyl-1-pentanol were added and reaction was allowed to take place under reflux for 2 hours. After subsequent drying at 120° C. under reduced pressure for 2 hours, 100 cc of dehydrated hexane and 0.1 mole of diethylaluminum chloride were added and a preliminary reduction was conducted at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.46, an MFR of 0.91 g/10 min, a density of 0.9205 g/cm$^3$ and an average particle diameter of 880 μm. Catalytic activity was as high as 250,000 g.copolymer/g.Ti. FR value was 7.4 and thus the molecular weight distribution was narrow. Melting point was 121.6° C. and hexane extraction was 2.5 wt %.

Example 4

(a) Preparation of Solid Catalyst Component

A three-necked flask equipped with a stirrer and a reflux condenser was purged with nitrogen, into which were then placed 50 cc of tetrahydrofuran and 0.05 mole of a solution of ethylmagnesium chloride in tetrahydrofuran. Then, 1.6 g (0.01 mole) of aluminum triethoxide, 17.0 g (0.05 mole) of tetrabutoxytitanium and 4.5 g (0.05 mole) of 2-methyl-1-pentanol were charged into the flask with stirring and reaction was allowed to take place under reflux for 3 hours. After cooling to room temperature, 46 g of silica (Fuji-Davison #955) which had been calcined at 400° C. for 3 hours was put into the flask and again reaction was conducted under reflux for 2 hours, followed by drying at 120° C. under reduced pressure for 2 hours. Then, 100 cc of dehydrated hexane and 0.1 mole of diethylaluminum chloride were added and a preliminary reduction was performed at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.44, an MFR of 1.04 g/10 min, a density of 0.9206 g/cm$^3$ and an average particle diameter of 840 μm. Catalytic activity was high as 230,000 g.copolymer/g.Ti. FR value was 7.4 and thus the molecular weight distribution was narrow. Melting point was 122.0° C. and hexane extraction was 3.0 wt %.

Example 5

A solid catalyst component was prepared in the same way as in Example 1 except that 11.7 g (0.05 mole) of dichlorodibutoxytitanium was used in place of tetraethoxytitanium. Using this solid catalyst component, a polymerization was performed in the same manner as in Example 1. As a result, there were obtained round particles having an MFR of 1.12 g/10 min, a density of 0.9214 g/cm$^3$, a bulk density of 0.42 and an average particle diameter of 870 μm. Catalytic activity was as high as 220,000 g.copolymer/g.Ti. FR value was 7.6 and thus the molecular weight distribution was narrow. Melting point was 122.3° C. and hexane extraction was 3.1 wt %.

Example 6

A solid catalyst component was prepared in the same way as in Example 1 except that 9.5 g (0.05 mole) of titanium tetrachloride was used in place of tetraethoxytitanium. Using this solid catalyst component, a polymerization was performed in the same manner as in Example 1. As a result, there were obtained round particles having an MFR of 0.84 g/10 min, a density of 0.9198 g/cm$^3$, a bulk density of 0.44 and an average particle diameter of 860 μm. Catalytic activity was as high as 240,000 g.copolymer/g.Ti. FR value was 7.7 and thus the molecular weight distribution was narrow. Melting point was 122.4° C. and hexane extraction was 3.0 wt %.

Example 7

(a) Preparation of Solid Catalyst Component

A three-necked flask equipped with a stirrer and a reflux condenser was purged with nitrogen, into which were then placed 50 cc of tetrahydrofuran and 0.05 mole of a solution of diethylmagnesium in tetrahydrofuran. Then, 1.6 g (0.01 mole) of aluminum triethoxide, 11.4 g (0.05 mole) of tetraethoxytitanium and 4.5 g (0.05 mole) of 2-methyl-1-pentanol were charged into the flask with stirring and reaction was allowed to take place under reflux for 3 hours.

After cooling to room temperature, 46 g of silica (Fuji-Davison #955) which had been calcined at 400° C. for 3 hours was put into the flask and again reaction was conducted under reflux for 2 hours, followed by drying at 120° C. under reduced pressure for 2 hours. Then, 100 cc of dehydrated hexane and 0.1 mole of diethylaluminum chloride were added and a preliminary reduction was performed at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.41, an MFR of 1.31 g/10 min, a density of 0.9220 g/cm$^3$ and an average particle diameter of 720 μm. Catalytic activity was as high as 210,000 g.copolymeri/g.Ti. FR value was 7.6 and thus the molecular weight distribution was narrow. Melting point was 121.8° C. and hexane extraction was 3.2 wt %.

Example 8

(a) Preparation of Solid Catalyst Component

A three-necked flask equipped with a stirrer and a reflux condenser was purged with nitrogen, into which were then placed 50 cc of tetrahydrofuran and 0.05 mole of a solution of ethylmagnesium chloride in tetrahydrofuran. Then, 1.6 g (0.01 mole) of aluminum triethoxide, 17.0 g (0.05 mole) of tetrabutoxytitanium and 12.8 g (0.1 mole) of 3,5-dimethyl-1-hexanol were charged into the flask with stirring and reaction was allowed to take place under reflux for 3 hours. After cooling to room temperature, 46 g of silica (Fuji Davison #955) which had been calcined at 400° C. for 3 hours was put into the flask and again reaction was performed under reflux for 2 hours, followed by drying at 120° C. under reduced pressure for 2 hours. Then, 100 cc of dehydrated hexane and 0.1 mole of diethylaluminum chloride were added and a preliminary reduction was conducted at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.45, an MFR of 0.84 g/10 min, a density of 0.9214 g/cm$^3$ and an average particle diameter of 850 μm. Catalytic activity was as high as 200,000 g.copolymer/g.Ti. FR value was 7.4 and thus the molecular weight distribution was narrow. Melting point was 121.9° C. and hexane extraction was 2.8 wt %.

Example 9

(a) Preparation of Solid Catalyst Component

A three-necked flask equipped with a stirrer and a reflux condenser was purged with nitrogen, into which were then placed 50 cc of tetrahydrofuran and 0.05 mole of a solution of ethylmagnesium chloride in tetrahydrofuran. Then, 1.6 g (0.01 mole) of aluminum triethoxide, 17.0 g (0.05 mole) of tetrabutoxytitanium and 5.8 g (0.05 mole) of 2-ethyl-1-hexanol were charged into the flask with stirring and reaction was allowed to take place under reflux for 3 hours. After cooling to room temperature, 46 g of silica (Fuji-Davison #955) which had been calcined at 400° C. for 3 hours was put into the flask and again reaction was performed under reflux for 2 hours, followed by drying at 120° C. under reduced pressure for 2 hours. Then, 100 cc of dehydrated hexane and 0.1 mole of ethylaluminum chloride were added and a preliminary reduction was conducted at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.25, an MFR of 0.96 g/10 min, a density of 0.9193 g/cm$^3$ and an average particle diameter of 850 μm. Catalytic activity was as high as 220,000 g.copolymer/g.Ti. FR value was 7.4 and thus the molecular weight distribution was narrow. Melting point of 121.5° C. and hexane extraction was 2.7 wt %.

Example 10

(a) Preparation of Solid Catalyst Component

A three-necked flask equipped with a stirrer and a reflux condenser was purged with nitrogen, into which were then placed 50 cc of tetrahydrofuran and 0.05 mole of a solution of ethylmagnesium chloride in tetrahydrofuran. Then, 1.6 g (0.01 mole) of aluminum triethoxide and 17.0 g (0.05 mole) of tetrabutoxytitanium were charged into the flask with stirring and reaction was allowed to take place under reflux for 3 hours. After cooling to room temperature, 46 g of silica (Fuji-Davison #955) which had been calcined at 400° C. for 3 hours was put into the flask and again reaction was performed under reflux for 2 hours, followed by drying at 120° C. under reduced pressure for 2 hours. Then, 100 cc of dehydrated hexane and 5.8 g (0.05 mole) of 2-ethyl-1-hexanol were added and reaction was conducted under reflux for 2 hours, followed by drying at 120° C. under reduced pressure for 2 hours. Subsequently, 100 cc of dehydrated hexane and 0.1 mole of diethylaluminum chloride were added and a preliminary reduction was performed at room temperature for 1 hour. The hexane was removed by blowing of nitrogen at 60° C. to obtain a solid catalyst component.

(b) Vapor Phase Polymerization

Using the solid catalyst component prepared above, a vapor-phase polymerization was carried out in the same way as in Example 1. As a result, there were obtained round particles having a bulk density of 0.45, an MFR of 0.93 g/10 min, a density of 0.9203 g/cm$^3$ and an average particle diameter of 900 μm. Catalytic. activity was as high as 260,000 g.copolymer/g.Ti. FR value was 7.4 and thus the molecular weight distribution was narrow. Melting point was 121.6° C. and hexane extraction was 2.6 wt %.

Example 11

A solid catalyst component was prepared in the same way as in Example 9 except that 1.5 g (0.01 mole) of boron triethoxide was used in place of aluminum ethoxide. Using this solid catalyst component, a polymerization was carried out in the same manner as in Example 1. As a result, there were obtained round particles having an MFR of 1.12 g/10 min, a density of 0.9199 g/cm³, a bulk density of 0.43 g/cm³ and an average particle diameter of 790 μm. Catalytic activity was as high as 200,000 g.copolymer/g.Ti. FR value was 7.6 and thus the molecular weight distribution was narrow. Melting point was 121.8° C. and hexane extraction was 2.9 wt %.

Example 12

A solid catalyst component was prepared in the same way as in Example 9 except that 1.2 g (0.11 mole) of magnesium ethoxide was used in place of aluminum ethoxide. Using this solid catalyst component, a polymerization was carried out in the same am manner as in Example 1. As a result, there were obtained round particles having an MFR of 1.09 g/10 min, a density of 0.9215 g/cm³, a bulk density of 0.42 g/cm³ and an average particle diameter of 780 μm. Catalytic activity was as high as 200,000 g.copolymer/g.Ti. FR value was 7.6 and thus the molecular weight distribution was narrow. Melting point was 122.2° C. and hexane extraction was 3.2 wt %.

Example 13

A solid catalyst component was prepared in the same way as in Example 9 except that 0.1 mole of ethylaluminum sesquichloride was used in place of diethylaluminum chloride. Using this solid catalyst component, a polymerization was carried out in the same manner as in Example 1. As a result, there were obtained round particles having an MFR of 1.20 g/10 min. a density of 0.9192 g/cm³, a bulk density of 0.44 g/cm³ and an average particle diameter of 840 μm. Catalytic activity was as high as 240,000 g.copolymer/g.Ti. FR value was 7.7 and thus the molecular weight distribution was narrow. Melting point was 122.8° C. and hexane extraction was 3.1 wt %.

Example 14

A solid catalyst component was prepared in the same way as in Example 1 except that silica-alumina was used in place of silica. Using this solid catalyst component, a polymerization was carried out in the same manner as in Example 1. As a result, there were obtained round particles having an MFR of 0.77 g/10 min, a density of 0.9224 g/cm³, a bulk density of 0.41 g/cm³ and an average particle diameter of 810 μm. Catalytic activity was as high as 190,000 g.copolymer/g.Ti. FR value was 7.5 and thus the molecular weight distribution was narrow. Melting point was 122.3° C. and hexane extraction was 2.8 wt %.

Example 15

A solid catalyst component was prepared in the same way as in Example 1 except that alumina was used in place of silica. Using this solid catalyst component, a polymerization was carried out in the same manner as in Example 1. As a result, there were obtained round particles having an MFR of 0.80 g/10 min, a density of 0.9231 g/cm³, a bulk density of 0.41 g/cm³ and an average particle diameter of 800 μm. Catalytic activity was as high as 200,000 g.copolymer/g.Ti. FR value was 7.6 and thus the molecular weight distribution was narrow. Melting point was 122.4° C. and hexane extraction was 2.9 wt %.

What is claimed is:

1. A process of preparing a polyolefin by polymerizing or copolymerizing an olefin or olefins in the presence of a catalyst comprising a solid catalyst component and an organoaluminum compound, said solid catalyst component being prepared by the reaction of the following components [I] and [II]:

[I] a reaction product obtained by the reaction of the following components (1), (2) and (3) in the presence of a compound represented by the general formula $$R^4OH$$

wherein $R^4$ is a hydrocarbon radical having 1 to 20 carbon atoms, or an organic radical containing such element as oxygen, nitrogen, sulfur, or chlorine:
(1) a silicon oxide and/or an aluminum oxide,
(2) a product obtained by a contact reaction of:
<a> an organomagnesium compound represented by the general formula $$R^1_m MgX_{2-m}$$

wherein $R^1$ is a hydrocarbon radical having 1 to 20 carbon atoms, X is a halogen atom, and m is in the range of $0 < m \leq 2$, and
<b> a compound represented by the general formula $$Me(OR^2)_n X_{z-n}$$

wherein Me represents an element of Groups I to IV of the Periodic Table, z is the valence of Me, n is in the range of $0 < n \leq z$, X is a halogen atom, and $R^2$ is a hydrocarbon radical having 1 to 20 carbon atoms, and
(3) a titanium compound represented by the general formula $$Ti(OR^3)_p X_{4-p}$$

wherein $R^3$ is a hydrocarbon radical having 1 to 20 carbon atoms, X is a halogen atom, and p is in the range of $0 \leq p \leq 4$; and

[II] a compound represented by the general formula $$AlR^5_q X_{3-q}$$

wherein $R^5$ is a hydrocarbon radical having 1 to 20 carbon atoms, X is a halogen atom, and q is in the range of $0 < q < 3$.

2. A process of claim 1 wherein the reaction of the compound of the general formula $Me(OR^2)_n X_{z-n}$ to the organomagnesium compound of the general formula $RmMgX_{2-m}$ is in the range of 0.01 to 10 in terms of Me/Mg (molar ratio).

3. A process of claim 1 wherein the reaction ratio of the component [I]-(1) and the component [I]-(2) is 0.01 to 20 mmol of the magnesium in the component [I]-(2) per gram of the component [I]-(1).

4. A process of claim 1 wherein the reaction ratio of the components [I]-(1) and [I]-(3) is 0.01 to 10 mmol of the component [I]-(3) per gram of the component [I]-(1).

5. A process of claim 1 wherein the reaction ratio of the components [I] and [II] is 0.01 to 100 in terms of the component [II]/the component [I]-(3) in the component [I] (molar ratio).

6. A process of claim 1 wherein the Me in the general formula $Me(OR)_nX_{z-n}$ is Mg, Al, B or Si.

7. A process of claim 1 wherein the olefin is ethylene.

8. A process of claim 1 wherein the olefins are ethylene and an α-olefin having 3–12 carbon atoms.

9. A process of claim 1 wherein the organoaluminum compound is used together with an organic acid ester.

10. A process of claim 1 wherein the polymerization reaction is conducted at a temperature of 20° C. to 120° C. and a pressure of atmospheric pressure to 70 kg/cm².

11. A process of claim 1 wherein the polymerization is conducted in vapor phase.

12. A process for preparing polyolefin comprising:
    (a) forming a reaction product by a contact reaction of:
        (i) an organomagnesium compound represented by the general formula $$R^1_mMgX_{2-m}$$

wherein $R^1$ is a hydrocarbon radical having 1 to 20 carbon atoms, X is a halogen atom, m is in the range of $0<m\leq 2$, and
        (ii) a compound represented by the general formula $$Me(OR^2)_nX_{z-n}$$

wherein Me represents an element of Groups I to IV of the Periodic Table, z is the valence of Me, n is in the range of $0<n\leq z$, X is a halogen atom, and $R^2$ is a hydrocarbon radical having 1 to 20 carbon atoms;
    (b) forming a reaction product by the reaction of the reaction product formed in step (a) with a silicon oxide and/or an aluminum oxide and a titanium compound represented by the general formula $$Ti(OR^3)_pX_{4-p}$$

wherein $R^3$ is a hydrocarbon radical having 1 to 20 carbon atoms, X is a halogen atom, and p is in the range of $0\leq p\leq 4$, the reaction of step (b) being conducted in the presence of a compound repressed by the general formula $$R^4OH$$

wherein $R^4$ is a hydrocarbon radical having 1 to 20 carbon atoms, or an organic radical containing such element as oxygen, nitrogen, sulfur, or chlorine:
    (c) forming a solid catalyst component by reacting the reaction product of step (b) with a compound represented by the general formula $$AlR^5_qX_{3-q}$$

wherein $R^5$ is a hydrocarbon radical having 1 to 20 carbon atoms, X is a halogen atom, and q is in the range of $0<q\leq 3$; and
    (d) polymerizing or copolymerizing an olefin or olefins in the presence of a catalyst comprising said solid catalyst component and an organoaluminum compound.

13. A process for preparing a polymer of ethylene comprising:
    (a) forming a reaction product by a contact reaction of:
        (i) an organomagnesium compound selected from the group consisting of ethylmagnesium chloride, n-butylmagnesium chloride and diethylmagnesium; and
        (ii) a compound selected from the group consisting of aluminum triethoxide, boron triethoxide and magnesium triethoxide;
    (b) forming a reaction product by the reaction of the reaction product formed in step (a) with a silicon oxide and/or an aluminum oxide and a titanium compound selected from the group consisting of tetraethoxytitanium, tetrabutoxytitanium, dichlorodibutyoxytitanium, and titaniumtetrachloride, the reaction of step (b) being conducted in the presence of a compound repressed by the general formula $$R^4OH$$

wherein $R^4$ is a hydrocarbon radical having 1 to 20 carbon atoms, or an organic radical containing such element as oxygen, nitrogen, sulfur, or chlorine;
    (c) forming a solid catalyst component by reacting the reaction product of step (b) with a compound represented by the general formula $$AlR^5_qX_{3-q}$$

wherein $R^5$ is a hydrocarbon radical having 1 to 20 carbon atoms, X is a halogen atom, and q is in the range of $0<q<3$; and
    (d) homopolymerizing ethylene or copolymerizing ethylene with butene in the presence of a catalyst comprising said solid catalyst component and an organoaluminum compound.

* * * * *